(12) United States Patent
Linde et al.

(10) Patent No.: US 11,038,200 B2
(45) Date of Patent: Jun. 15, 2021

(54) STRUCTURAL COMPONENT HAVING AN INTEGRATED BATTERY CONSTRUCTION

(71) Applicants: Airbus Operations GmbH, Hamburg (DE); Airbus Defence and Space GmbH, Ottobrunn (DE)

(72) Inventors: Peter Linde, Hamburg (DE); Christian Karch, Neubiberg (DE)

(73) Assignees: Airbus Operations GmbH; Airbus Defence and Space GmbH

( * ) Notice: Subject to any disclaimer, the term of this patent is extended or adjusted under 35 U.S.C. 154(b) by 148 days.

(21) Appl. No.: 16/388,311

(22) Filed: Apr. 18, 2019

(65) Prior Publication Data

US 2019/0334203 A1    Oct. 31, 2019

(30) Foreign Application Priority Data

Apr. 27, 2018  (DE) .......................... 102018110164.3

(51) Int. Cl.
| | | |
|---|---|---|
| *H01M 10/0562* | (2010.01) | |
| *B60L 50/64* | (2019.01) | |
| *H01M 4/04* | (2006.01) | |
| *H01M 4/131* | (2010.01) | |
| *H01M 4/66* | (2006.01) | |

(52) U.S. Cl.
CPC ......... *H01M 10/0562* (2013.01); *B60L 50/64* (2019.02); *H01M 4/0404* (2013.01); *H01M 4/131* (2013.01); *H01M 4/663* (2013.01)

(58) Field of Classification Search
CPC .......... H01M 10/0562; H01M 4/0404; H01M 4/131; H01M 4/663
See application file for complete search history.

(56) References Cited

U.S. PATENT DOCUMENTS

| | | | | |
|---|---|---|---|---|
| 2014/0017550 A1* | 1/2014 | Wang | ..................... | H01M 4/667 429/152 |
| 2014/0170503 A1* | 6/2014 | Yushin | .............. | H01M 10/0525 429/306 |
| 2014/0205898 A1* | 7/2014 | Lee | ..................... | H01M 4/0402 429/211 |

FOREIGN PATENT DOCUMENTS

EP    3273505 A1    1/2018

* cited by examiner

*Primary Examiner* — Olatunji A Godo
(74) *Attorney, Agent, or Firm* — Lerner, David, Littenberg, Krumholz & Mentlik, LLP

(57) ABSTRACT

A structural component for a vehicle has a battery construction having a solid-electrolyte matrix material, a first layer of carbon fibres having a cathode-active coating, embedded in said solid-electrolyte matrix material, a second layer of carbon fibres without a cathode-active coating, embedded in said solid-electrolyte matrix material, and at least one electrically isolating barrier layer disposed between said first layer and said second layer. The structural component has a first collector layer and a second collector layer disposed on the first layer and the second layer, respectively, on a side that faces away from the barrier layer. The first collector layer and the second collector layer are configured from a flexible, moldable and porous layer of carbon allotropes.

10 Claims, 2 Drawing Sheets

STRUCTURAL COMPONENT HAVING AN INTEGRATED BATTERY CONSTRUCTION

CROSS-REFERENCE TO PRIORITY APPLICATION

This application claims the benefit of, and priority to, German patent application number DE 102018110164.3, filed Apr. 27, 2018. The content of the referenced application is incorporated by reference herein.

TECHNICAL FIELD

Embodiments of the subject matter described herein relate generally to a structural component for a vehicle, to a method for producing a structural component, and to a vehicle having at least one such structural component.

BACKGROUND

For optimizing the weight of an aircraft or another vehicle it is known for the functions of a plurality of components to be combined with one another and to be replaced by a multifunctional component. One example of a multifunctional component of this type is the so-called structural battery which has a tiered construction, which is capable of being integrated in a structural component from fibre-reinforced plastics materials, or can configure such a structural component from fibre-reinforced plastics materials, respectively.

A structural battery can have, for example, a tiered construction from a woven carbon-fibre fabric. An anode and a cathode can be implemented herein by a woven carbon-fibre fabric which is embedded in a plastics material matrix. In the case of the cathode, the carbon fibres can be provided with a coating that emits ions. An ion-permeable barrier layer for electrical isolation is provided between the cathode and the anode. A collector from a metallic material adjoins both the cathode as well as the anode, wherein aluminum is often used. The structural battery, apart from the function thereof as a battery, can also have a very high mechanical strength on account of this construction. Integrating the structural battery in a structural component of an aircraft or vehicle is accordingly readily possible.

Patent publication EP 3 273 505 A1 discloses a structural component which configures an electrical energy source and simultaneously is equipped with installations for conducting electric current.

BRIEF SUMMARY

It is an object of the disclosure to propose a structural battery or a structural component which has even further improved properties in terms of the function as a battery, as well as a reduced weight.

The object is achieved by a structural component having the features of independent claim 1. Advantageous embodiments and refinements can be derived from the dependent claims and the description hereunder.

Proposed is a structural component for a vehicle, having a battery construction having a solid-electrolyte matrix material; a first layer of carbon fibres having a cathode-active coating, embedded in said solid-electrolyte matrix material; a second layer of carbon fibres without a cathode-active coating, embedded in said solid-electrolyte matrix material; and at least one electrically isolating barrier layer disposed between said first layer and said second layer; furthermore having a first collector layer and a second collector layer which are disposed on the first layer and the second layer, respectively, on a side that faces away from the barrier layer, wherein the first collector layer and the second collector layer are in each case configured from a flexible, moldable and porous layer of carbon allotropes.

The particular advantage of the structural component according to the disclosure lies in that the part of the structural component that functions as a battery can be readily produced by a substantially conventional method for producing a component from a fibre-composite material. The first layer of carbon fibres, the second layer of carbon fibres, the barrier layer, and both collector layers are flexible and can be applied in the manner of webs and in an automated manner to a mold surface. Since the carbon allotropes moreover have a lower density than aluminum, the structural battery included in the structural component, or implemented on account of the latter, can have a lower weight than known structural batteries. A significantly improved shaping capability and an improved mechanical stability are simultaneously guaranteed.

The first layer of carbon fibres can comprise one or a plurality of tiers of carbon fibres. Said carbon fibres could be provided in the form of woven fabrics and comprise a plurality of fibre tiers and fibre orientations. The alignment of the fibres herein, could be adapted to required mechanical properties, as is also the case in conventional structural components. Alternatively thereto, tiers from non-woven carbon fibres or cross-laid carbon fibre structures, respectively, could also be used. The carbon fibres herein could have one or a plurality of discrete fibre orientations, or be implemented in an omnidirectional manner in order to achieve quasi-isotropic properties. Here too, a plurality of tiers having dissimilar alignments can be placed on top of one another.

The cathode-active coating in the use of a lithium-ion-based battery is a lithium-containing transition metal oxide or a lithium-containing transition metal phosphate. Said substances are capable of reversibly storing lithium ions and releasing the latter again. The coating of the carbon fibres of the first layer can be carried out by soaking, dipping, or spraying using a suitable solution, wherein other variants are however also not excluded.

The second layer of carbon fibres does not mandatorily have to have a coating since carbon per se can be used as active material for negative electrodes. When required it would nevertheless be possible for the carbon fibres to be coated with an additional anode-active material which comprises silicon, for example.

The first layer and the second layer in terms of handling cannot be differentiated from other layers of a tiered construction which is used in the case of conventional CFRP components. The barrier layer can be implemented by dissimilar flexural, planar material webs which permit embedding into the matrix material or adhering to the latter. A preferred variant will be discussed further below.

The collector layers can be referred to as a cathode collector layer and an anode collector layer. Both of said layers have a construction from a carbon allotrope, having a sufficient conductivity and being able to replace aluminum-based metal webs. One particular further advantage lies in that the first collector layer and the second collector layer have a significantly lower material discontinuity in relation to the contiguous carbon fibre layers than webs from aluminum. On account thereof, a chemical corrosion incompatibility of aluminum electrodes and carbon fibres is prevented, and the durability is improved.

In one preferred embodiment, at least one of the collector layers comprises carbon nanotubes which are embedded in the matrix material or form a porous woven fabric. Moreover, the carbon nanotubes have a significantly lower weight than an aluminum-based structure. Moreover, the current load capability of a structure from carbon nanotubes is higher by a multiple than that of aluminum or copper.

It is preferable that at least one of the collector layers is configured from a porous mat of non-woven carbon nanotubes. The mat is particularly suitable for being integrated in a conventional production process for a structural component from carbon-fibre-reinforced plastics material. The individual carbon nanotubes adhere to one another on account of the Van der Waals forces and display a quasi-isotropic tensile strength behavior. A particularly advantageous replacement of an otherwise metallic web material is thus achieved.

The cathode-active coating can comprise $LiFeO_2$. Lithium iron oxide can lead to an improved storage capacity at simultaneously significantly lower production costs.

However, other lithium metal oxide compounds are also conceivable so that the compounds do not have to be limited to lithium iron oxide. In particular, lithium cobalt oxides could be used, which have been commercially used for some time.

The barrier layer can comprise non-conducting fibres, in particular glass fibres. Glass fibres, just like carbon fibres, by virtue of the suitability of said fibres for processing as flexural woven fabrics or cross-laid structures can be very easily processed and adapted to desired mechanical properties. Since glass fibres are moreover non-conducting, it can be expedient for a glass-fibre-based barrier layer to be incorporated in the battery construction.

Alternatively, the barrier layer can also comprise carbon fibres which have an insulating coating. The material continuity within the battery construction is improved, and the stability is slightly increased in comparison to glass fibres. Voltage jumps and instances of delamination can consequently be better avoided in particular in the position of the barrier layer.

In this context it is to be pointed out that all barrier layers must be embodied in such a manner that ions, in particular lithium ions, can be discharged by the cathode and received by the anode.

The structural component in one advantageous embodiment can furthermore have at least one additional structural layer which covers the battery construction at least on one side and reinforces the structural component. Such a structural layer can be disposed only on one side or on both sides of the battery construction. The additional use of this/these additional layer(s) leads to an encapsulation of the battery construction and to a further increased strength of the structural component. In the case of aircraft and in particular commercial aircraft, further functional layers can moreover adjoin, said functional layers being suitable for lightning protection, for structural health monitoring, or similar applications.

The collector layers could in each case be equipped with at least one electrical connector member, wherein all connector members extend to the same side of the battery construction. The battery construction for utilizing the battery has to also be electrically connected, wherein the electrical connector members in this instance should preferably be on the same side of the battery construction. The connector members could be, for instance, studs or pins, respectively, which extend in each case from one of the collector layers to the respective side of the battery construction.

The disclosure furthermore relates to a method for producing a structural component, in particular a structural component as has been explained above. The method comprises the steps of applying a first collector layer, a first layer of carbon fibres having a cathode-active coating, an electrically isolating barrier layer, a second layer of carbon fibres without a cathode-active coating, and a second layer of carbon fibres, as well as the collective curing. In one preferred embodiment, disposing can be performed with the aid of an automated device. Said automated device is preferably equipped with an automated fibre-depositing head or an automated tape-depositing head.

The disclosure furthermore relates to a vehicle having at least one structural component of this type. The vehicle is in particular an aircraft.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

Further features, advantages, and potential applications of the present disclosure are derived from the description hereunder of the exemplary embodiments and the figures. All of the features which are described and/or are illustrated pictorially form, individually and in any combination, the subject matter of the disclosure also regardless of their inclusion in the individual claims or the dependency references thereof. Furthermore, in the figures, the same reference signs refer to identical or similar objects.

DETAILED DESCRIPTION

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

Figure 1:
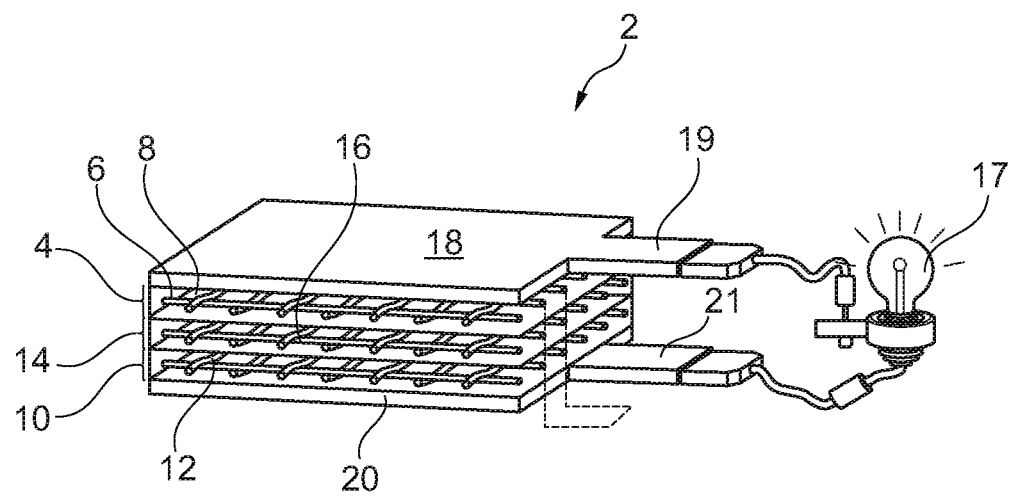
FIG. 1 shows a battery construction of a structural component of a vehicle in a schematic three-dimensional sectional illustration.

FIG. 1 shows a battery construction 2 of a structural component of a vehicle. The battery construction has a first layer 4 from carbon fibres 6 having a cathode-active coating, wherein the carbon fibres 6 are embedded in a conductive matrix material 8. A second layer 10 of carbon fibres 12 in which the carbon fibres 12 do not have any cathode-active coating is provided. The carbon fibres 12 of the second layer 10 can overall have no coating or have a silicon-containing coating.

An electrically isolating barrier layer 14 which in an exemplary manner comprises glass fibres 16 is disposed between the first layer 4 and the second layer 10. Said barrier layer 14 is permeable to lithium ions which can diffuse from the first layer 4 through the barrier layer 14 into the second layer 10.

A first collector layer 18 which in an exemplary manner exists in the form of a non-woven mat from carbon nanotubes is disposed on a side of the first layer 4 that faces away from the barrier layer 14. In a manner analogous thereto, a second collector layer 20 which can likewise be composed of a mat of non-woven carbon nanotubes is disposed on a side of the second layer 10 that faces away from the barrier layer 14. Both collector layers 18 and 20 have a particularly low weight and can usually replace web-shaped metal.

Connector members 19 and 21 are necessary for connecting the battery construction 2 to a consumer 17 which here is indicated only in an exemplary manner. Said connector members 19 and 21 are attached to the collector layers 18 and 20 and make available an electrical connector. The connector members 19 and 21 could also be implemented in the form of insulated pins which extend in a direction transverse to the individual layers of the battery construction 2. As is shown in dashed lines, the connector member 19 could also be routed beside the connector member 21 onto the same side of the battery construction 2.

Figure 2:
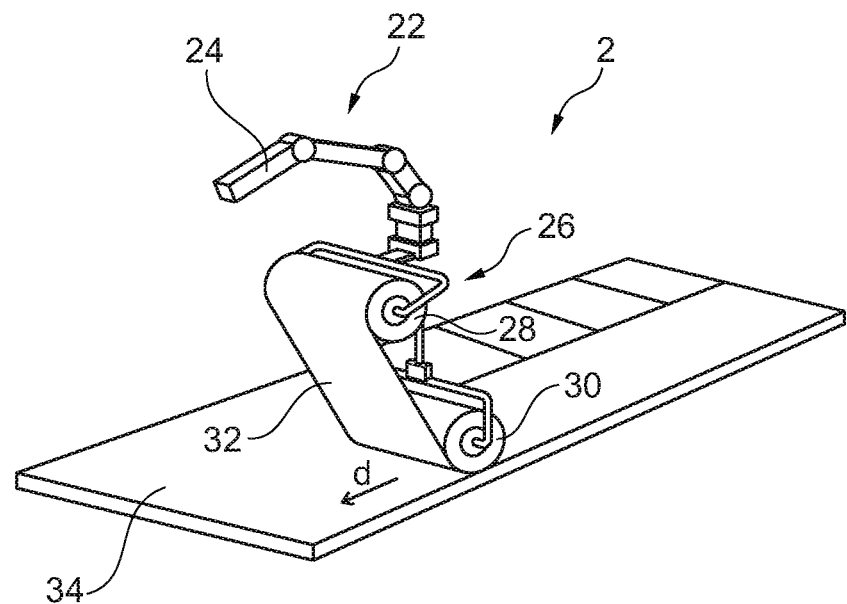
FIG. 2 shows a device for the automated production of a structural component.

A particular advantage of this construction lies in that conventional automated methods and devices can be used in the production. The battery construction 2 which is produced by an automated device 22 is illustrated in FIG. 2. The device 22 in an exemplary manner is represented by a robotic arm 24 which in an exemplary manner supports an automated tape-depositing head 26. The latter in an exemplary manner has a dispensing roller 28 and a deflection roller 30.

Web-shaped material 32 is dispensed by the dispensing roller 28 by a displacement movement in a depositing direction d, said web-shaped material 32 being deposited onto the substrate 34 by the deflection roller 30. Of course, this method commences by depositing said material on a molding tool which lies below the bottom-most tier. The web-shaped material can also be disposed on a plurality of dispensing rollers 28 so that the cathode, the anode, the collector layers, the barrier layer, and all further layers, could be provided without replacing a dispensing roller. It is particularly expedient for pre-impregnated webs to be used, the fibre types and the matrix material in said webs potentially being dissimilar when required. A barrier layer can be implemented, for instance, by a woven glass-fibre fabric which is embedded in a non-conducting matrix.

Once all of the webs have been deposited, curing can be performed in the usual manner. To this end, the molding tool can be moved into a curing oven and therein be heated according to requirements.

Figure 3:
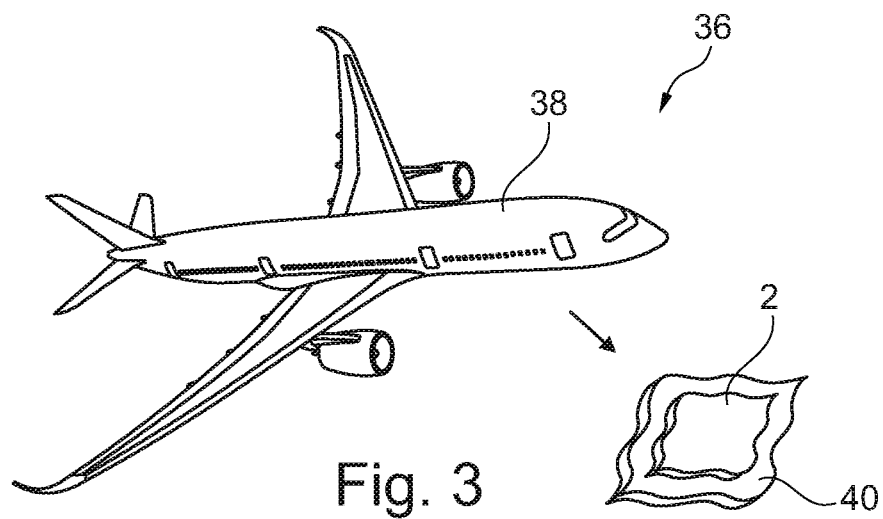
FIG. 3 shows an aircraft which includes a structural component having a battery construction.

FIG. 3 shows an aircraft 36 which has structural components 38 which could be equipped with a battery construction 2. The indication of the reference sign 38 is not intended to necessarily point out an external primary aircraft structure but can also relate to internal structures. A structural component 38 is schematically shown in a somewhat enlarged illustration in which an external layer 40 is provided with a battery construction 2. A further external layer can furthermore be applied to the side of the battery construction 2 that faces away from the external layer 40. All external layers 40 and the battery construction 2 disposed therein can be produced in a self-contained method so that a monolithic component is finally generated.

Figure 4:
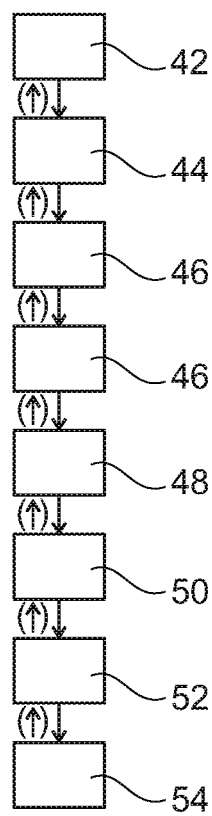
FIG. 4 shows a schematic block diagram of a method for producing a structural component.

FIG. 4 finally shows a schematic illustration of a sequence diagram of the method according to the disclosure. The latter comprises the steps of applying 42 a first collector layer 18 from a flexural layer of carbon allotropes, applying a first layer 4 of carbon fibres having a cathode-active coating, applying an electrically isolating barrier layer 14, applying a second layer 10 of carbon fibres without a cathode-active coating, applying a second collector layer 20 from a flexural layer of carbon allotropes, and collective curing 52. As is indicated by the directional arrows set in brackets in FIG. 4, the method can of course also proceed in another sequence. Furthermore, it is also possible for a plurality of said method steps to be carried out simultaneously or to be combined in one step, respectively, by pre-fabricating a plurality of layers, for instance.

In one advantageous embodiment, the method can moreover comprise applying 54 at least one additional structural layer 40 which covers the battery construction 2 on at least one side and reinforces the structural component 38.

Additionally, it should be noted that "having" does not exclude any other elements or steps and "a" or "an" does not exclude a multiplicity. It should furthermore be noted that features which have been described in the context of one of the above embodiment examples can also be used in combination with other features of other embodiment examples described above. Reference signs in the claims should not be regarded as restrictive.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A structural component for a vehicle, comprising:
    a battery construction having a solid-electrolyte matrix material;
    a first layer of carbon fibres having a cathode-active coating, embedded in said solid-electrolyte matrix material;
    a second layer of carbon fibres without a cathode-active coating, embedded in said solid-electrolyte matrix material;
    at least one electrically isolating barrier layer disposed between said first layer and said second layer; and
    a first collector layer and a second collector layer which are disposed on the first layer and the second layer, respectively, on a side that faces away from the barrier layer, wherein the first collector layer and the second collector layer are each configured from a flexible, moldable and porous layer of carbon allotropes.

2. The structural component according to claim 1, wherein at least one of the collector layers comprises carbon nanotubes which are embedded in the matrix material or form a woven fabric.

3. The structural component according to claim 2, wherein at least one of the collector layers is configured from a porous mat of non-woven carbon nanotubes.

4. The structural component according to claim 1, wherein the cathode-active coating comprises $LiFeO_2$.

5. The structural component according to claim 1, wherein the barrier layer comprises non-conducting fibres.

6. The structural component according to claim 1, wherein the barrier layer comprises carbon fibres which have an insulating coating.

7. The structural component according to claim 1, further comprising at least one additional structural layer which covers the battery construction at least on one side and reinforces the structural component.

8. The structural component according to claim 1, wherein the collector layers are each equipped with at least one electrical connector member, wherein all connector members extend to the same side of the battery construction.

9. A vehicle having at least one structural component according to claim 1.

10. The vehicle according to claim 9, wherein the vehicle is an aircraft.

* * * * *